Figure 1:
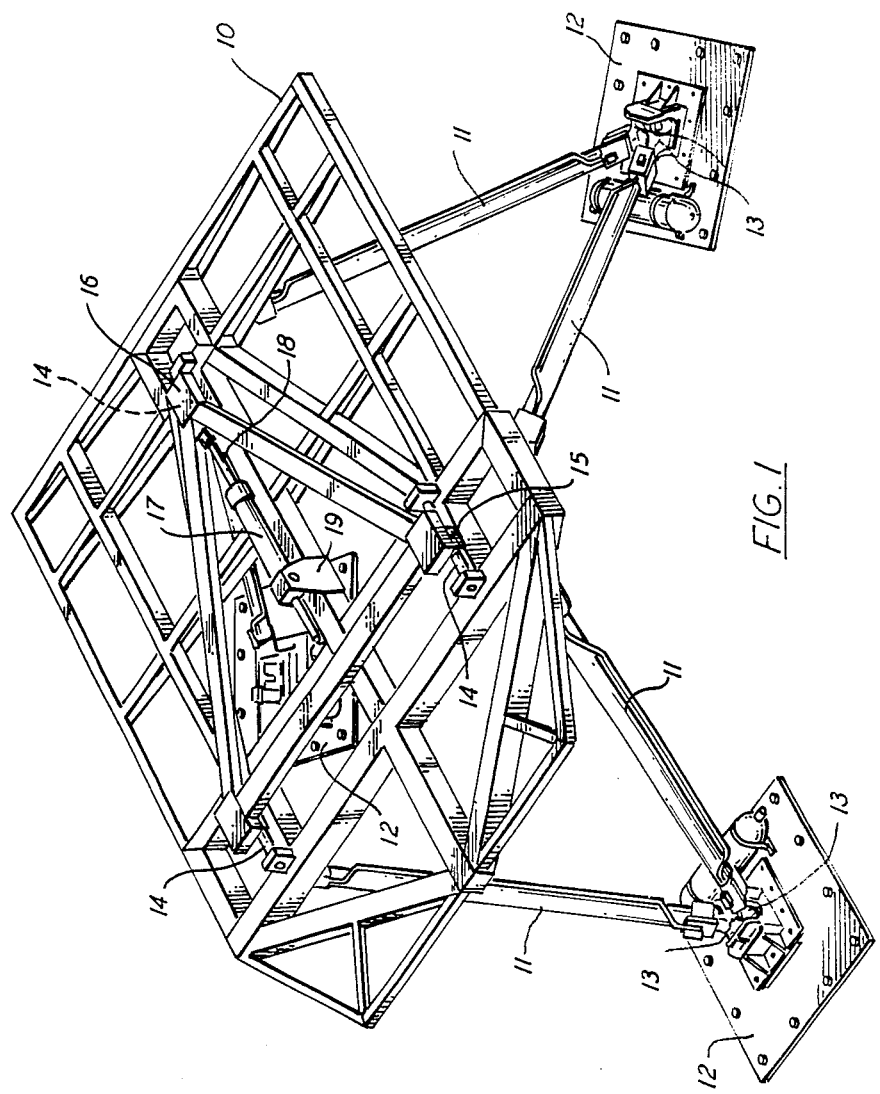

United States Patent [19]

Hart et al.

[11] Patent Number: 4,753,596

[45] Date of Patent: Jun. 28, 1988

[54] MOTION SIMULATOR

[75] Inventors: John W. Hart, Worthing; Anthony J. Summerfield, Horsham; William D. Lee, Brighton, all of England

[73] Assignee: The Singer Company, Binghamton, N.Y.

[21] Appl. No.: 896,784

[22] Filed: Aug. 15, 1986

[30] Foreign Application Priority Data

Aug. 27, 1985 [GB] United Kingdom ............... 8521298

[51] Int. Cl.$^4$ .............................................. G09B 9/04
[52] U.S. Cl. ...................................... 434/29; 434/58
[58] Field of Search ...................... 434/29, 34, 51, 55, 434/56, 57, 58, 59, 62, 69

[56] References Cited

U.S. PATENT DOCUMENTS

| | | | |
|---|---|---|---|
| 3,064,471 | 11/1962 | Pierce | 434/55 X |
| 3,295,224 | 1/1967 | Cappel | 434/58 |
| 3,451,146 | 6/1969 | Pancoe et al. | 434/34 |
| 4,321,044 | 3/1982 | Kron | 434/59 |

Primary Examiner—William H. Grieb
Attorney, Agent, or Firm—Barry L. Haley

[57] ABSTRACT

A motion simulator for simulating the working characteristics of motion vehicles is based on the synergistic 'six degrees of freedom' system. The apparatus of the simulator comprises a main frame 10 mounted on three pairs of extensible and retractable legs 11 by means of a corresponding number of universal pivots. The pairs of legs 11 are arranged in a triangular formation on the underside of the frame 10 such that adjacent legs 11 from adjacent vertices of the formation converge to a common foot, to which they are secured by further universal pivots 13. Movement of the frame 10 is achieved by the relative extension and retraction of the legs 11.

Supplementary longitudinal acceleration effects are simulated by means of a surge frame 14 slidably mounted on the main frame 10 and independently actuated by means of a piston and cylinder device 17 to move in a fore/aft sense with respect to the frame 10.

1 Claim, 2 Drawing Sheets

MOTION SIMULATOR

This invention relates to motion simulator systems and more particularly to a ground vehicle motion simulator system.

When training people to control such things as aircraft and large vehicles it is more convenient to begin with simulated experience before embarking on expensive and potentially less safe training on the real thing. For this purpose motion simulators have been developed.

The simulation of motion by means of a simulator relies partially upon the fact that the human brain can be influenced into experiencing apparent motion by a combination of momentary accelerations, inclinations of the body and visual effects.

In simulating ground vehicles it is necessary to represent, not only the motion of the vehicle but also sometimes severe attitudes induced by the terrain over which the vehicle is supposed to be travelling.

To achieve this simulation of motion there are currently several simulated motion systems for various applications. One of these is a synergistic six degrees of freedom (6 D.O.F.) system, which is primarily used for simulating the flying characteristics of aircraft. The six degrees of freedom are pitch, roll, yaw, surge, sway and heave. Also, there are three degrees of freedom (3 D.O.F.) systems which are derived according to the characteristics required to be simulated and are adequate in the simulation of the principal characteristics of some single seat light aircraft and ground vehicles.

6 D.O.F. systems are usually designed with the simulation of acceleration in mind as well as the simulation of attitude. This acceleration simulation is acheived by accelerating the trainee away from a mean position on the simulator and gradually fading them back to the mean position; a procedure known as 'washing out'. As ground vehicle development has progressed, the need to provide more complex and expanded training programs has increased. This has to be reflected in the performance of motion simulation systems. Thus for ground vehicles, a motion simulation system must be capable of providing both the simulation of the supposed terrain (static) and the characteristics of the vehicle in reaction thereto (dynamic),i.e pitching, rolling, yawing and heaving, whilst still achieving the simulation of longitudinal accelerations due to the vehicle acceleration, braking, gear changing and the like. Natural physical limits occur in the use of synergistic motion systems which prevent such longitudinal acceleration simulation without it adversely affecting the quality of the simulation of the various other effects.

Previous synergistic 6 D.O.F. systems will simulate the general terrain effects, whether static or dynamic, as felt through vehicle suspension, but may not provide the additional requirements of acceleration or surge on top of this, particularly when at extreme attitudes.

The current 3 D.O.F. systems have fixed centres of rotation. This particularly limits their ability to place the driver in the correct relationship with respect to the simulated vehicle centre of rotation. This is not the case in a 6 D.O.F. motion system as the instantaneous centre of rotation may be in any position. 3 D.O.F. motion systems also suffer from the disadvantage that they may not settle in a level position when the power system malfunctions, hence a level of agility may be required by the trainee to enable him or her to evacuate the vehicle. Furthermore, such fixed centres of rotation in 3 D.O.F. systems only allow pitching, rolling and yawing effects in addition to the static ground effects. Dynamic ground effects, such as heaving, and surge effects, such as braking, accelerating and gear changing, can only be added via the pitch axis which is not strictly realistic.

Thus, according to the present invention there is provided apparatus for simulating motion comprising a main frame, a plurality of extensible and retractable legs, each leg being secured to the main frame at one end thereof by means of a corresponding universal pivot and independently actuated to extend and retract by leg actuating means, a foot, secured to the other end of each leg by means of a further corresponding universal pivot, anchoring the other ends of the legs in their relative positions, and a surge frame slidably mounted on a straight track on the main frame and actuated to move on the track by means of frame actuating means.

Figure 2:
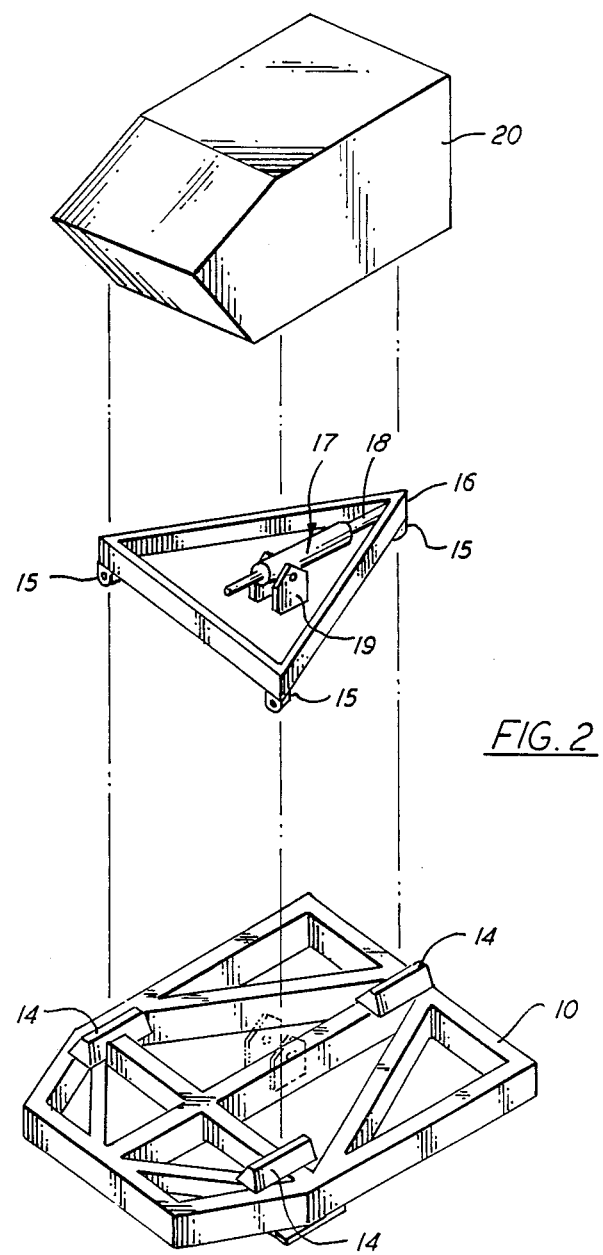

A specific embodiment of the invention will now be described by way of example with reference to the accompanying drawings in which:

FIG. 1 is a schematic diagram of a motion simulator incorporating the invention, and FIG. 2 is an exploded view of the frames of FIG. 1 and illustrating the mounting position of a suitable cabin.

Referring to the figures, a main frame 10 is supported on a set of six extensible and retractable legs 11. Each leg 11 is secured at one end to the underside of the frame 10 by means of a corresponding universal pivot (not shown) to define a generally triangular shape, such that the ends of a pair of legs 11 is located nominally at each vertex of the generally triangular shape. Each leg 11 from one vertex is secured at its other end to a foot 12, along with the adjacent leg 11 of an adjacent vertex, also by means of a corresponding universal pivot 13.

The legs 11 are independently actuated such that the attitude of the frame 10 is variable according to the relative extension and retraction of each leg 11. As such, the frame is able to simulate motion according to the basic 6 D.O.F. system which, in this embodiment, is designed around a motion leg extension with the ability to achieve ±30° of pitch.

The main frame 10 has three halves 14 of three linear bearings mounted on its upper surface, the axis of each bearing half 14 being in the fore/aft direction of the frame 10. The other half 15 of each bearing is attached to the underside of a surge frame 16. With the corresponding halves 14 and 15 of the bearing cooperating the surge frame 16 is free to move fore and aft within the bearing limits.

The surge frame 16 is moved on the linear bearings by means of an independently actuated hydraulic piston and cylinder device 17. The cylinder is fixedly secured to the main frame 10 by a trunnion 19 and the piston is connected with the surge frame 16 by a piston rod 18. A driver's cabin 20 is rigidly secured to the surge frame 16 such that a trainee will experience the supplementary surge effects in the direction he is facing at that time.

The surge frame 16 is symmetrically disposed about the main frame roll axis with the longitudinal actuator 17 being mounted directly above the roll axis. When the main motion frame 10 is driven in the modes of pitch, roll, yaw or heave etc., or any combination of these, the actuator 17 can be driven separately to provide acceleration cues, in the direction of motion being simulated at the time, without degradation of the other motion cues.

Signals to drive the longitudinal actuator 17 will be generated either by the operation of an accelerator, footbrake or gear selector. Translation of the signals will be via pre-programmed software which controls the movement of the actuators.

We claim:

1. A motion simulator for simulating the motion of a land vehicle such as a tank that provides simulation of motion in six degrees of freedom and includes pitch, roll, yaw rotationally and longitudinal, lateral, and vertical linearly and in addition permits a second, independent longitudinal linear motion simulation comprising:

a land vehicle training cockpit for simulating a particular type of land vehicle;

a main support frame;

anchoring means;

a six degree of freedom synergistic motion assembly connected to said main frame, said six degree of freedom motion assembly including six extensible and retractable legs, each leg connected at one end to the main frame, and at the other end of said anchoring means such that each leg is anchored in a fixed position relative to the other legs;

means for independently actuating each of said legs;

a surge frame connected to said vehicle cockpit;

a straight track connected to said main frame and disposed along the track longitudinal axis in a direction parallel to the longitudinal axis of the vehicle cockpit, said surge frame movably connected to said track; and actuating means connected to said surge frame and said main frame for moving said surge frame linearly along said track to provide independent additional longitudinal linear motion to said cockpit regardless of the position of the six degree of freedom motion assembly legs.

* * * * *